Feb. 20, 1945.    N. P. STECKLER    2,369,988
CHILD'S GROWING RECORD CHART
Filed March 20, 1943
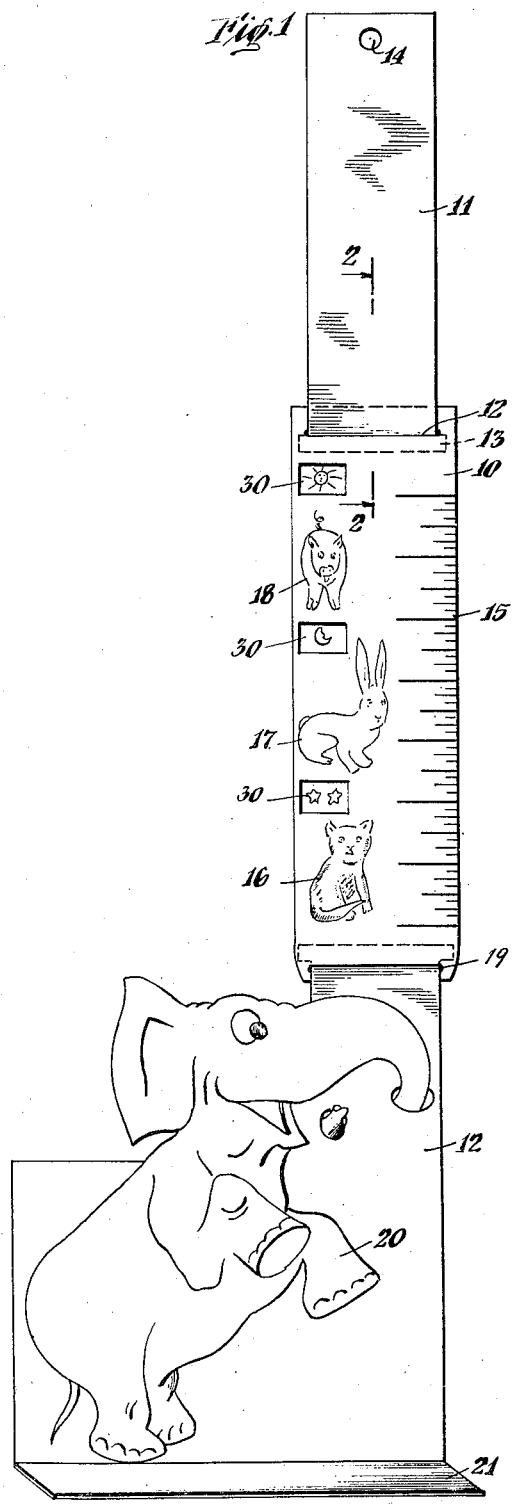
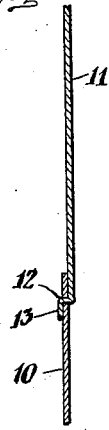
INVENTOR.
Nat P. Steckler
BY
ATTORNEY Patented Feb. 20, 1945

2,369,988

UNITED STATES PATENT OFFICE 2,369,988

CHILD'S GROWING RECORD CHART

Nat P. Steckler, New York, N. Y.

Application March 20, 1943, Serial No. 479,885

1 Claim. (Cl. 35—1)

My invention relates to a new and useful device for keeping a growing child's record of yearly growth and increase in weight to be suspended from a wall above a weighing scale, and it is the principal object of my invention to provide such a chart made in sections and provided with suitable graduations.

Another object of my invention is to provide such a chart or record provided with suitable illustrations to awaken and hold the child's interest by means of suitable representations of animals, etc., thus simultaneously serving as an educational means to acquaint the child during its growing years with the subjects of natural history.

A further object of my invention is the provision of a sectional chart which can be extended to suit the growth of the child and the individual sections of which can be conveniently extended and are held in their extended state by any suitable means.

A still further object of my invention is the provision of a record chart for recording the yearly growth and increase of weight of the child which, when not in use can be rolled or otherwise folded to keep a yearly record from the time on which the child is able to stand on its own feet up to any desired number of years.

It is also one of the objects of my invention to provide a device of this character which is simple and inexpensive in its construction, yet durable and highly efficient in use, and which may bear various illustrations or advertisements relating for instance to the treatment of a child during sickness, to the quality of food or milk to be given at various periods of the child's growth etc.

These and other objects and advantages of my invention will become more fully known as the description thereof proceeds, and will then be more specifically defined in the appended claim.

In the accompanying drawing forming a material part of this disclosure:

Fig. 1 is a front elevation of a sectional chart embodying my invention in its preferred form.

Fig. 2 is a section on line 2—2 of Fig. 1.

As illustrated in Figs. 1 and 2, the chart consists of the sections 10 and 11 respectively, it is however understood that any number to suit can be employed according to wish and requirement. The section 10 has near its upper end a slot 12 through which the lower end of section 11 formed to constitute a retaining or locking member is passed as indicated at 13, Fig. 2 to firmly but detachably unite both sections. The upper end of section 11 has an opening 14 in order to hang the chart from a nail in a wall or the like. The section 10 carries at its front suitable graduations 15 indicating the progressive growth of the child, and laterally disposed thereto the chart section 10 carries the pictures of animals, such as a cat, rabbit, hog, suckling pig or the like, the representations of which are marked, 16, 17 and 18 respectively; it is however understood that other animals, flowers suitably named, etc., may be marked on the chart.

The lower edge of section 10 is also slotted, as at 19 to receive the upper edge of a base formed to constitute a retaining or locking member, said base representing for instance an elephant in rearing position, as indicated at 20, preferably in rear of a platform 21 on which the child may stand during measuring. The trunk of the elephant is passed through a hole in section 12 carrying platform 21, and the elephant will thus appear to the child to be holding the parts of the scale in alignment when the chart is suspended from a nail at 14.

As shown on Fig. 1 I have provided a plurality of windows 30 through which pictures for holding the child's attention, as for instance, representations of the sun, moon and stars may be displayed in any suitable manner. It will be clear that the graduations are present on all of the sections, and may indicate growth in any of the well known scales.

It will be understood that I have described and shown the preferred forms of my invention as a few examples only of the many possible ways to practically construct the same and that I may make such changes in the general arrangement and construction of the minor details of the invention as come within the scope of the appended claims without departure from the spirit of my invention and the principles involved.

Having thus described my invention, what I claim as new and desire to secure by Letters Patent is:

A chart to indicate a child's growth and upon which to record his growth comprising a plurality of sections, one of said sections having openings formed at both of its ends, retaining or locking members formed at one end of the adjoining sections to engage into the respective opening in the middle section to prevent accidental separation of the individual sections, a platform for the child to stand on formed with one of the sections having a hole, said section displaying the representation of an elephant having its trunk passed through said hole and suggestive of the elephant holding the individual sections in alignment when the chart is suspended from a suitable support at one end of the upper section, the intermediate section provided with suitable graduations to indicate the progressive growth of the child, and means on said section to hold the child's attention during the measuring operation and to display through suitable windows pictorial means representing sun, moon and stars.

NAT P. STECKLER.